US010531148B2

(12) United States Patent
Heffernan

(10) Patent No.: US 10,531,148 B2
(45) Date of Patent: Jan. 7, 2020

(54) METHODS AND APPARATUS TO DETECT AUDIO ENGINEERING PROBLEMS USING IDENTIFICATION OF ISOLATED WATERMARKS

(71) Applicant: The Nielsen Company (US), LLC, New York, NY (US)

(72) Inventor: Ronan Heffernan, Wesley Chapel, FL (US)

(73) Assignee: The Nielsen Company (US), LLC, New York, NY (US)

( * ) Notice: Subject to any disclaimer, the term of this patent is extended or adjusted under 35 U.S.C. 154(b) by 123 days.

(21) Appl. No.: 15/640,043

(22) Filed: Jun. 30, 2017

(65) Prior Publication Data
US 2019/0007729 A1 Jan. 3, 2019

(51) Int. Cl.
*H04N 21/439* (2011.01)
*H04H 60/66* (2008.01)
*H04N 21/442* (2011.01)
*H04N 21/8358* (2011.01)
*H04H 60/37* (2008.01)
*H04H 60/40* (2008.01)
*H04H 60/43* (2008.01)
*H04H 60/45* (2008.01)
*H04H 60/56* (2008.01)
(Continued)

(52) U.S. Cl.
CPC ........ *H04N 21/4394* (2013.01); *H04H 60/37* (2013.01); *H04H 60/40* (2013.01); *H04H 60/43* (2013.01); *H04H 60/45* (2013.01); *H04H 60/56* (2013.01); *H04H 60/66* (2013.01); *H04N 21/44209* (2013.01); *H04N 21/8358* (2013.01); *G10L 19/018* (2013.01); *H04H 2201/50* (2013.01); *H04H 2201/90* (2013.01); *H04N 2017/006* (2013.01)

(58) Field of Classification Search
CPC ... H04N 21/4394; G10L 19/018; H04H 60/66
See application file for complete search history.

(56) References Cited

U.S. PATENT DOCUMENTS 5,481,294 A 1/1996 Thomas et al.
6,512,837 B1 1/2003 Ahmed
(Continued)

OTHER PUBLICATIONS

Gomes et al., "Audio Watermarking and Fingerprinting: For Which Applications?", May 9, 2002 (21 pages).
(Continued)

*Primary Examiner* — Chenea Davis
(74) *Attorney, Agent, or Firm* — Hanley Flight & Zimmerman, LLC

(57) ABSTRACT

Example methods and apparatus to detect audio engineering problems using identification of isolated watermarks are disclosed herein. Disclosed example methods include identifying, by executing an instruction with a processor, isolated watermarks in a first set of detected watermarks obtained from first media monitored at a first site. Disclosed example methods further include determining, by executing an instruction with the processor, a problem has been detected with the first media associated with the first set of detected watermarks in response to a first number of isolated watermarks identified in the first set of detected watermarks satisfying a first threshold.

14 Claims, 13 Drawing Sheets

(51) Int. Cl.
    *G10L 19/018*    (2013.01)
    *H04N 17/00*    (2006.01)

(56) References Cited

U.S. PATENT DOCUMENTS

| | | |
|---|---|---|
| 7,024,018 B2 | 4/2006 | Petrovic |
| 7,171,018 B2 | 1/2007 | Rhoads et al. |
| 8,121,830 B2 | 2/2012 | Srinivasan et al. |
| 8,130,811 B2 | 3/2012 | Tian et al. |
| 8,369,688 B2 | 2/2013 | Nakano et al. |
| 8,806,517 B2 | 8/2014 | Petrovic et al. |
| 8,971,567 B2 | 3/2015 | Reed et al. |
| 9,055,239 B2 | 6/2015 | Tehranchi et al. |
| 9,105,091 B2 | 8/2015 | He et al. |
| 9,251,322 B2 | 2/2016 | Tehranchi et al. |
| 2006/0257001 A1 | 11/2006 | Van Der Veen et al. |
| 2008/0002854 A1* | 1/2008 | Tehranchi ............... G06F 21/10 382/100 |
| 2008/0137749 A1 | 6/2008 | Tian et al. |
| 2013/0117571 A1* | 5/2013 | Petrovic .................... H04L 9/00 713/176 |
| 2016/0148334 A1 | 5/2016 | Petrovic et al. |

OTHER PUBLICATIONS

U.S. Appl. No. 15/192,676, "Methods and Apparatus to Perform Symbol-Based Watermark Detection" filed Jun. 24, 2016 (70 pages).

\* cited by examiner

METHODS AND APPARATUS TO DETECT AUDIO ENGINEERING PROBLEMS USING IDENTIFICATION OF ISOLATED WATERMARKS

FIELD OF THE DISCLOSURE

This disclosure relates generally to improving media transmission and, more particularly, to methods and apparatus to detect audio engineering problems using identification of isolated watermarks.

BACKGROUND

For many years, media undergoing transmission has included watermarks. Watermarks are embedded in the media outside the perception of the viewer. Audience measurement entities use the detection of watermarks to identify a source and/or ownership of presented media.

Watermarks embedded in transmitted media may repeat regularly throughout the duration of presentation. The watermarks are often repeated at regular intervals to improve accuracy of collected data and each watermark may include an identification and a timestamp.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
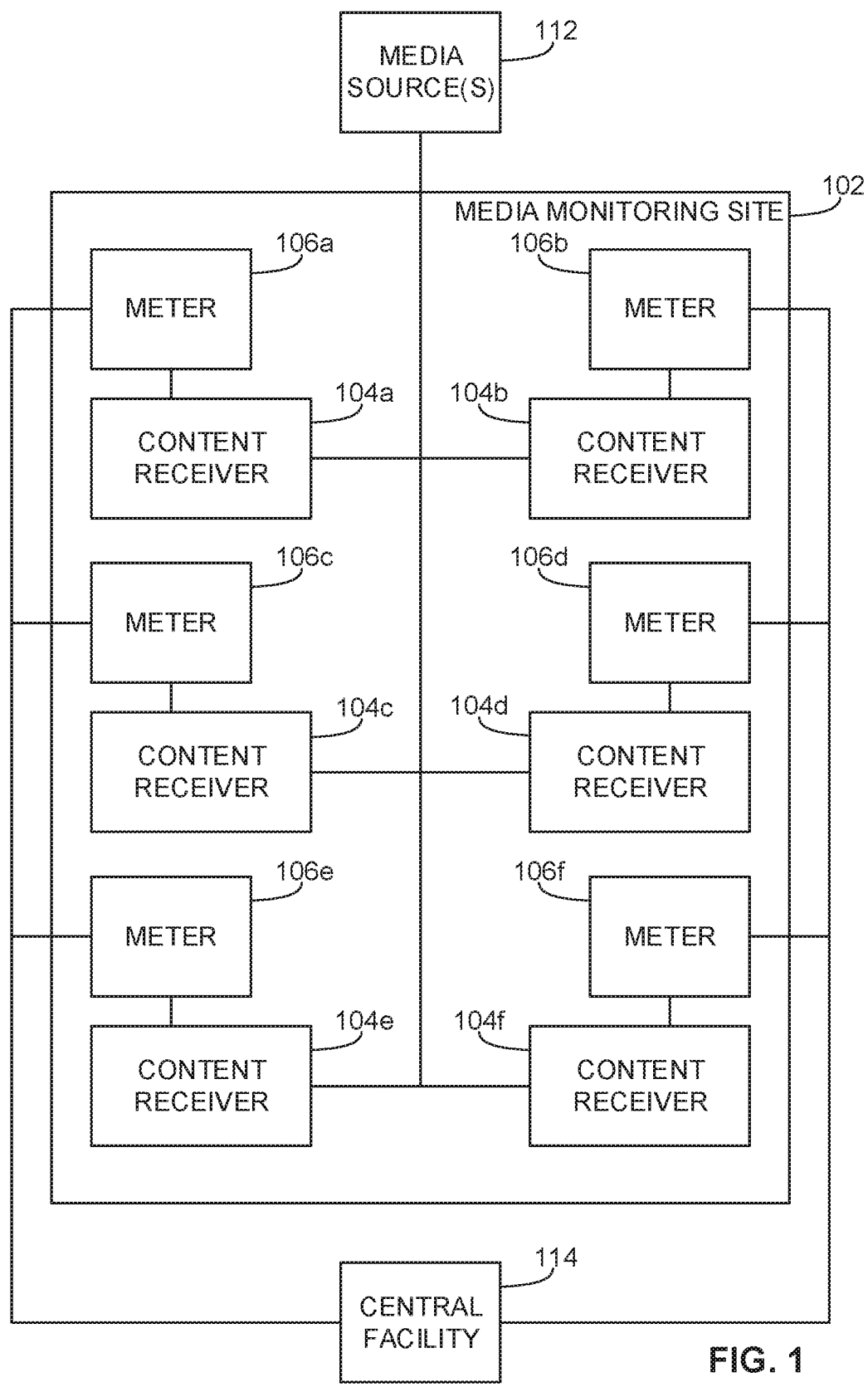
FIG. 1 illustrates an example media monitoring system including a media monitoring site for detecting broadcasted watermarks

Watermarks are embedded in a variety of audio/visual media. For example, broadcasters, such as television broadcasters, radio broadcasters, cable television providers, satellite television providers, etc., embed watermarks in the broadcasted media. As such, watermarks are embedded in media, such as news, televised dramas, movies, etc., transmitted by the television station broadcaster, and are received at a media presentation site such as a home or business.

In some examples, an audio watermark is embedded in a news broadcast transmitted to a presentation site. Watermarks transmitted to presentation sites can be detected by a meter utilized by an audience measurement entity for detecting embedded watermarks. For example, watermarks detected by the meter are used by the audience measurement entity to determine what media was presented and for how long the media was presented. These watermarks are often repeated at a regular interval to improve the accuracy of the watermark data being collected.

Audience measurement entities determine what media was presented and for how long the media was presented based on the detection of watermarks. For example, embedded watermarks in the transmitted media are embedded as audio, imperceptible to an audience, yet perceptible by a meter. In such examples, the meter can detect embedded watermarks and determine the information contained in the audio signal. Embedded watermarks can include information such as, but not limited to, a station identifier (SID), a media identifier, and a timestamp, etc., among other media identifying information.

In some examples, watermarks as transmitted, as received, or as presented are incorrect (referred to herein as errant watermarks). In the past, errant watermarks were removed or ignored in detected watermark data. Watermarks can become errant watermarks as a result of technical difficulties at the presentation site, problems in the transmission, or issues related to the embedding of the watermark in the media. Errant watermarks may not properly identify the station transmitting the media, and, in some examples, may be only one errant watermark among dozens of good watermarks.

Some of these watermarks may be isolated, errant watermarks. For example, an errant watermark would be identified as a single isolated watermark if, over a short period of time (e.g., 30 seconds, 2 minutes, etc.), only one watermark incorrectly identifies the SID. For example, a meter detects watermarks on channel 1 media being presented at a presentation site for five minutes, but may detect a single watermark for channel 2. In such an example, the single watermark identifying channel 2 would be considered an isolated watermark (e.g., a single, bad watermark).

In accordance with the present disclosure, the detection of isolated watermarks can be used to determine the existence of problems in the engineering, transmission, reception, and/or presentation of media. The regular and consistent detection of isolated watermarks can, for example, be indicative of problems with media reception. In some examples, the problem can be identified as a site-specific problem (e.g., a reception problem), while in other examples, the problem can be identified as systemic (e.g., a problem with the audio engineering or transmission).

In some examples, a meter monitoring at a media monitoring site operates to detect for watermarks embedded in broadcasted media. Consider an example in which a meter detects an errant watermark every thirty seconds to a minute over a two-hour period. In such an example, the errant watermarks are detected and identified as isolated watermarks. In examples disclosed herein, the watermark data is evaluated over a measurement interval and, for example, a histogram of the watermarks detected is made and the number of isolated watermarks is evaluated against a threshold. If the number of isolated watermarks meets a threshold, the isolated watermarks are attributed to the existence of a problem with media transmission, reception, or presentation; otherwise, the number of isolated watermarks does not indicate a problem and the isolated watermarks are ignored.

In some examples, meters are located at separate geographic locations. For example, the meters could be located at two media monitoring sites, a media monitoring site and a house, two different houses, or a house and a broadcasting source, or other locations receiving or presenting media. The example meters at the different locations detect watermark data. If multiple meters at separate geographic locations are detecting watermarks for the same media, their reported data can be compared at a central processing facility, such as an audience measurement entity. In some examples, one, some, or all of the meters will identify problems with the watermarks embedded in the media.

In some examples, when just one example media monitoring site among multiple media monitoring sites detects a problem with watermarked media presentations, the audience measurement entity can, for example, identify the problem as a site-specific problem (e.g., a problem with the media monitoring system, the meter, etc.). However, if multiple example meter monitoring sites detect a problem with the same watermarked media, the example audience measurement entity can identify the problem as being a systemic problem. In such examples, the appropriate measures can be taken to resolve the problems with the media broadcast and/or presentation. Resolving problems in the broadcast and/or presentation of media based on isolated watermarks (e.g., bad watermarks) will improve the fields of media broadcasting and audience measurement.

FIG. 1 illustrates an example media monitoring system 100 including a media monitoring site 102 for detecting broadcasted watermarks. In the illustrated example of FIG. 1, the example media monitoring site 102 includes content receivers 104a, 104b, 104c, 104d, 104e, 104f connected to meters 106a, 106b, 106c, 106d, 106e, 106f respectively. For example, there is a content receiver for all media broadcasted regionally, such as television, cable, satellite, radio, streaming, etc. The example content receivers 104a, 104b, 104c, 104d, 104e, 104f receive the media but do not present the media via a display screens and/or speakers, however in other examples, the content receivers 104a, 104b, 104c, 104d, 104e, 104f are additionally connected to media presentation devices (e.g., display screens, speakers, projectors, etc.).

In the illustrated example, the content receivers 104a, 104b, 104c, 104d, 104e, 104f receive broadcasted media from media sources 112. In some examples, each content receiver 104a, 104b, 104c, 104d, 104e, 104f receives and processes different media. For example, television programs broadcasted on channel 1 are an assigned media source to be received by content receiver 104a and television programs broadcasted on channel 2 are an assigned media source to be received by content receiver 104b.

The content receivers 104a, 104b, 104c, 104d, 104e, 104f receive media from the media sources 112. The media sources 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the content receivers 104a, 104b, 104c, 104e, 104f can correspond to a receiver that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media sources 112, etc., is also typically included in the media.

The example media monitoring site 102 also includes meters 106a, 106b, 106c, 106d, 106e, 106f to detect and decode watermarks embedded in media received at the content receivers 104a, 104b, 104c, 104d, 104e, 104f. In the illustrated example, the meters 106a, 106b, 106c, 106d, 106e, 106f send watermark data to a central facility 114, in other examples, the meters 106a, 106b, 106c, 106d, 106e, 106f send watermark data back to the media sources 112 or both to the media sources 112 and the central facility 114.

In examples disclosed herein, to monitor media received by the content receivers 104a, 104b, 104c, 104d, 104e, 104f, the meters 106a, 106b, 106c, 106d, 106e, 106f of the illustrated example use one or more physical connections to the content receivers 104a, 104b, 104c, 104d, 104e, 104f (e.g., via coaxial RF connection, USB connection, a High Definition Media Interface (HDMI) connection, an Ethernet cable connection, etc.). For example, the meters 106a, 106b, 106c, 106d, 106e, 106f process the signals obtained from the content receivers 104a, 104b, 104c, 104d, 104e, 104f to detect media and/or source identifying signals (e.g., audio watermarks) embedded in portion(s) (e.g., audio portions) of the media presented by the content receivers 104a, 104b, 104c, 104d, 104e, 104f.

In accordance with the present disclosure, meters 106a, 106b, 106c, 106d, 106e, 106f and content receivers 104a, 104b, 104c, 104d, 104e, 104f are assigned to process broadcasted media. For example, the meter 106a, connected with the content receiver 104a assigned to process a broadcasted media, detects and decodes watermarks for the broadcasted media, and does not detect and decode watermarks for a different broadcasted media. In such an example, if the content receiver 104a is assigned to receive media broadcasted by channel 1, the example meter 106a only detects watermarks for channel 1, and watermarks not associated with channel 1 are errant watermarks.

Figure 2:
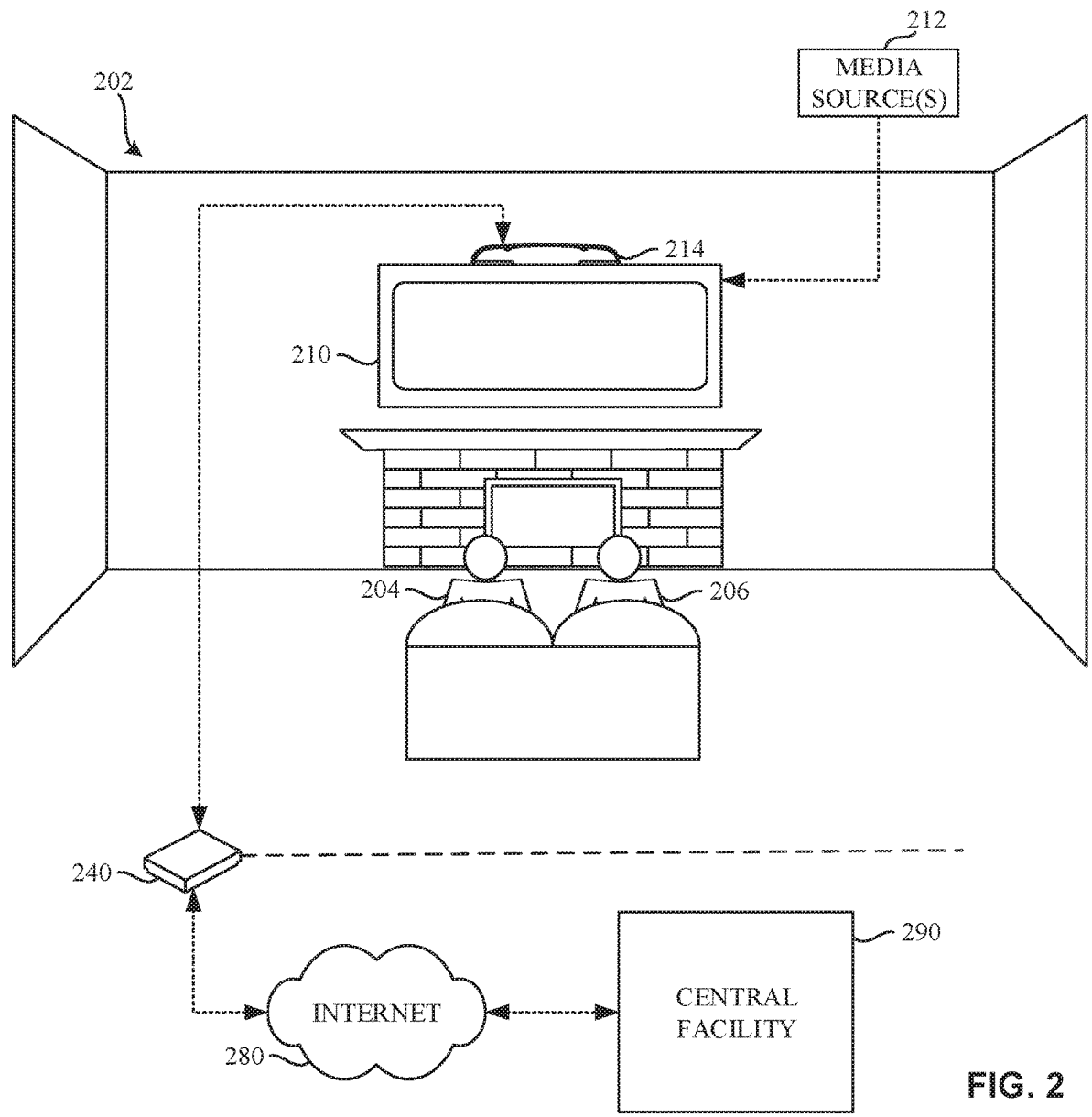
FIG. 2 illustrates an example media monitoring system including a meter for detecting presented watermarks.

FIG. 2 is an illustration of an example audience measurement system constructed in accordance with the teachings of this disclosure to perform watermark detection. In the illustrated example of FIG. 2, an example media presentation site 202 includes example panelists 204, 206, an example media device 210 that receives media from an example media source 212 such as a media broadcaster, and an example meter 214. The example meter 214 identifies the media presented by the example media device 210 and reports media monitoring information, including detected watermark information, to an example central facility 290, such as an example audience measurement entity, via an example gateway 240 and an example network 280. In some examples, the meter 214 is referred to as an audience measurement device.

In the illustrated example of FIG. 2, the example media presentation site 202 is a room of a household (e.g., a room in a home of a panelist, such as the home of a "Nielsen family"). In the illustrated example of FIG. 2, the example panelists 204, 206 of the household have been statistically selected to develop media ratings data (e.g., television ratings data) for a population/demographic of interest. In some examples, an entire family may be enrolled as a household of panelists. That is, while a mother, a father, a son, and a daughter may each be identified as individual panelists, their viewing activities typically occur within the family's household.

In the illustrated example of FIG. 2, the example media device 210 is a television. However, the example media device 210 can correspond to any type of audio, video and/or multimedia presentation device capable of presenting media audibly and/or visually. In some examples, the media device 210 (e.g., a television) may communicate audio to another media presentation device (e.g., an audio/video receiver) for output by one or more speakers (e.g., surround sound speakers, a sound bar, etc.). As another example, the media device 210 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 204, 206).

The media device 210 receives media from the media source 212. The media source 212 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media device 210 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 212, etc., is also typically included in the media.

In examples disclosed herein, an audience measurement entity provides the meter 214 to the panelist 204, 206 (or household of panelists) such that the meter 214 may be installed by the panelist 204, 206 by simply powering the meter 214 and placing the meter 214 in the media presentation site 202 and/or near the media device 210 (e.g., near a television set). In some examples, more complex installation activities may be performed such as, for example, affixing the meter 214 to the media device 210, electronically connecting the meter 214 to the media device 210, etc. The example meter 214 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 290 via the gateway 240 and the network 280. While the media monitoring information is transmitted by electronic transmission in the illustrated example of FIG. 2, the media monitoring information may additionally or alternatively be transferred in any other manner, such as, for example, by physically mailing the meter 214, by physically mailing a memory of the meter 214, etc.

The meter 214 of the illustrated example combines audience measurement data and people metering data. For example, audience measurement data is determined by monitoring media output by the media device 210 and/or other media presentation device(s), and audience identification data (also referred to as demographic data, people monitoring data, etc.) is determined from people monitoring data provided to the meter 214. Thus, the example meter 214 provides dual functionality of an audience measurement meter that is to collect audience measurement data, and a people meter that is to collect and/or associate demographic information corresponding to the collected audience measurement data.

For example, the meter 214 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 210. To extract media identification data, the meter 214 of the illustrated example of FIG. 2 monitors for watermarks (sometimes referred to as codes) included in the presented media. In examples disclosed herein, a watermark includes a sequence of symbols, with each symbol carrying a portion of media-identifying information which, when concatenated, form a complete watermark. In at least some prior watermarking systems, when any symbol is indecipherable, the entire watermark is discarded. Such an approach can result in missed watermarks.

Depending on the type(s) of metering the meter 214 is to perform, the meter 214 can be physically coupled to the media device 210 or may be configured to capture media signal(s) (e.g., audio) emitted externally by the media device 210 (e.g., free field audio) such that direct physical coupling to the media device 210 (e.g., media presenting device) is not required. For example, the meter 214 of the illustrated example may employ non-invasive monitoring not involving any physical connection to the media device 210 (e.g., via Bluetooth® connection, WIFI® connection, acoustic sensing via one or more microphone(s) and/or other acoustic sensor(s), etc.) and/or invasive monitoring involving one or more physical connections to the media device 210 (e.g., via USB connection, a High Definition Media Interface (HDMI) connection, an Ethernet cable connection, etc.).

In examples disclosed herein, to monitor media presented by the media device 210, the meter 214 of the illustrated example senses audio (e.g., acoustic signals or ambient audio) output (e.g., emitted) by the media device 210. For example, the meter 214 processes the signals obtained from the media device 210 to detect media and/or source identifying signals (e.g., audio watermarks) embedded in portion(s) (e.g., audio portions) of the media presented by the media device 210. To, for example, sense ambient audio output by the media device 210, the meter 214 of the illustrated example includes an example acoustic sensor (e.g., a microphone). In some examples, the meter 214 may process audio signals obtained from the media device 210 via a direct cable connection to detect media and/or source identifying audio watermarks embedded in such audio signals.

The meter 214 of the illustrated example communicates with a remotely located central facility 290, such as the audience measurement entity. In the illustrated example of FIG. 2, the example meter 214 communicates with the central facility 290 via a gateway 240 and a network 280. The example meter 214 of FIG. 2 sends media identification data and/or audience identification data to the central facility 290 periodically, a-periodically and/or upon request by the central facility 290.

The example gateway 240 of the illustrated example of FIG. 2 can be implemented by a router that enables the meter 214 and/or other devices in the media presentation site (e.g., the media device 210) to communicate with the network 280 (e.g., the Internet.)

In some examples, the example gateway 240 facilitates delivery of media from the media source(s) 212 to the media device 210 via the Internet. In some examples, the example gateway 240 includes gateway functionality such as modem capabilities. In some other examples, the example gateway 240 is implemented in two or more devices (e.g., a router, a modem, a switch, a firewall, etc.). The gateway 240 of the illustrated example may communicate with the network 226 via Ethernet, a digital subscriber line (DSL), a telephone line, a coaxial cable, a USB connection, a Bluetooth connection, any wireless connection, etc.

In some examples, the example gateway 240 hosts a Local Area Network (LAN) for the media presentation site 202. In the illustrated example, the LAN is a wireless local area network (WLAN), and allows the meter 214, the media device 210, etc., to transmit and/or receive data via the Internet. Alternatively, the gateway 240 may be coupled to such a LAN.

The network 280 of the illustrated example can be implemented by a wide area network (WAN) such as the Internet. However, in some examples, local networks may additionally or alternatively be used. Moreover, the example network 280 may be implemented using any type of public or private network such as, but not limited to, the Internet, a telephone network, a local area network (LAN), a cable network, and/or a wireless network, or any combination thereof.

The central facility 290 of the illustrated example is implemented by one or more servers. The central facility 290 processes and stores data received from the meter(s) 214. For example, the example central facility 290 of FIG. 2 combines audience identification data and program identification data from multiple households to generate aggregated media monitoring information. The central facility 290 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 214 of the illustrated example provides a combination of media metering and people metering. The meter 214 of FIG. 2 includes its own housing, processor, memory and/or software to perform the desired media monitoring and/or people monitoring functions. The example meter 214 of FIG. 2 is a stationary device disposed on or near the media device 210. In the illustrated example, the meter 214 is affixed to a top of the media device 210. However, the meter 214 may be affixed to the media device in any other orientation, such as, for example, on a side of the media device 210, on the bottom of the media device 210, and/or may not be affixed to the media device 210. For example, the meter 214 may be placed in a location near the media device 210.

The meter 214 of the illustrated example detects and decodes watermark data for media selected by panelists 204, 206. In some examples, the detected watermark data may cover a variety of broadcasted media, and the meter 214 does not identify errant watermarks in the same manner meters 106a, 106b, 106c, 106d, 106e, 106f of FIG. 1 detect errant watermarks. For example, meter 214 may need to detect an errant watermark among dozens of watermarks for a given broadcasted media to identify a watermark as an isolated watermark.

Figure 3:
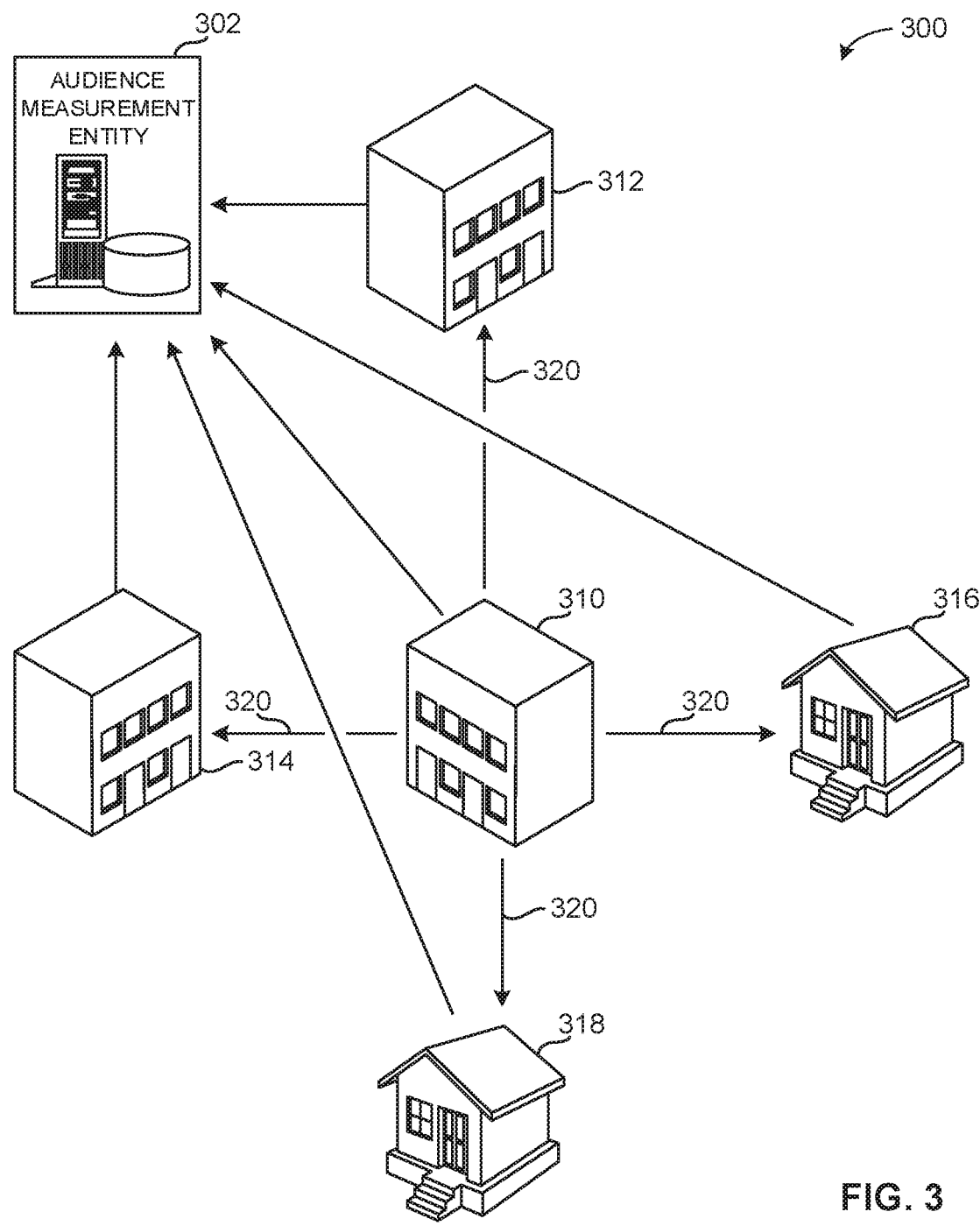
FIG. 3 illustrates an example audience measurement system for detecting watermarks embedded in broadcasted media.

FIG. 3 illustrates an example audience measurement system 300 for detecting watermarks embedded in transmitted media. In the illustrated example of FIG. 3, an audience measurement entity 302 receives detected watermark data from an example media broadcaster 310, example media monitoring sites 312, 314, and example media presentation sites 316, and 318. In some examples, the example audience measurement entity 302 corresponds to the example central facility 290 of FIG. 2.

In the illustrated example of FIG. 3, the audience measurement entity 302 receives detected watermark data from several different sources, the media broadcaster 310, the media monitoring sites 312, 314, and the media presentation sites 316, 318. The example media broadcaster 310 detects and reports data on a set of watermarks prior to transmission of media 320. Additionally, the audience measurement entity 302 receives data on watermarks received at the example media monitoring sites 312, 314 and presented at the example media presentation sites 316, 318. For example, one or more of the media monitoring sites 312, 314 could be similar or identical to the media monitoring site 102 of FIG. 1. Additionally, one or more of the media presentation sites 316, and 318 could be similar or identical to the example media presentation site 202 of FIG. 2. Additionally, one or more of the media monitoring sites 312, 314 and/or the media presentation sites 316, 318 may correspond to media monitoring facilities implemented by the audience measurement entity 302 and/or another entity or entities to monitor media transmissions (e.g., broadcasts) in a given geographic area, from one or more sources, etc.

For example, both media monitoring site 312 and media monitoring site 314 receive a media 320 from the example media broadcaster 310. In one example, the audience measurement entity 302 receives watermark data from both the media monitoring site 312 and the media monitoring site 314, however media monitoring site 312 indicates isolated watermarks in the media 320 and media monitoring site 314 does not. In such examples, the audience measurement entity 302 would identify the isolated watermarks detected by the example media monitoring site 312 as a site-specific problem. In other examples, the audience measurement entity receives watermark data from both the media monitoring site 312 and the media monitoring site 314, and both media monitoring sites 312, 314 identify isolated watermarks in the media 320. In such examples, the audience measurement entity 302 would identify the isolated watermarks detected by both media monitoring sites 312, 314 as a systemic problem associated with the media broadcaster 310.

In some examples, both media presentation site 316 and media presentation site 318 receive the media 320 from the media broadcaster 310. In one example, the audience measurement entity 302 receives watermark data from both the media presentation site 316 and the media presentation site 318, however media presentation site 316 indicates isolated watermarks in the media 320 and media presentation site 318 does not. In such examples, the audience measurement entity 302 would identify the isolated watermarks detected by the example media presentation site 316 as a site-specific problem. In other examples, the audience measurement entity receives watermark data from both the media presentation site 316 and the media presentation site 318, and both media presentation sites 316, 318 identify isolated watermarks in the media 320. In such examples, the audience measurement entity 302 would identify the isolated watermarks detected by both media presentation sites 316, 318 as a systemic problem associated with the media broadcaster 310.

Additionally or alternatively, in some regions, only one media monitoring site 312 is within broadcasting range of the example media broadcaster 310. As a result, the example audience measurement entity 302 receives watermark data from the media monitoring site 312 and the media presentation site 316, and the media monitoring site 312 indicates isolated watermarks in the media 320 and the media presentation site 316 does not indicate isolated watermarks in the media 320. In such an example, the audience measurement entity 302 identifies isolated watermarks in detected by the media monitoring site 312 as a site-specific problem. In other examples, the audience measurement entity receives watermark data from both the media monitoring site 312 and the media presentation site 316, and both media monitoring site 312, and media presentation site 316 identify isolated watermarks in the media 320. In such examples, the audience measurement entity 302 would identify the isolated watermarks detected by both media monitoring site 312, and the media presentation site 316 as a systemic problem associated with the media broadcaster 310.

Figure 4:
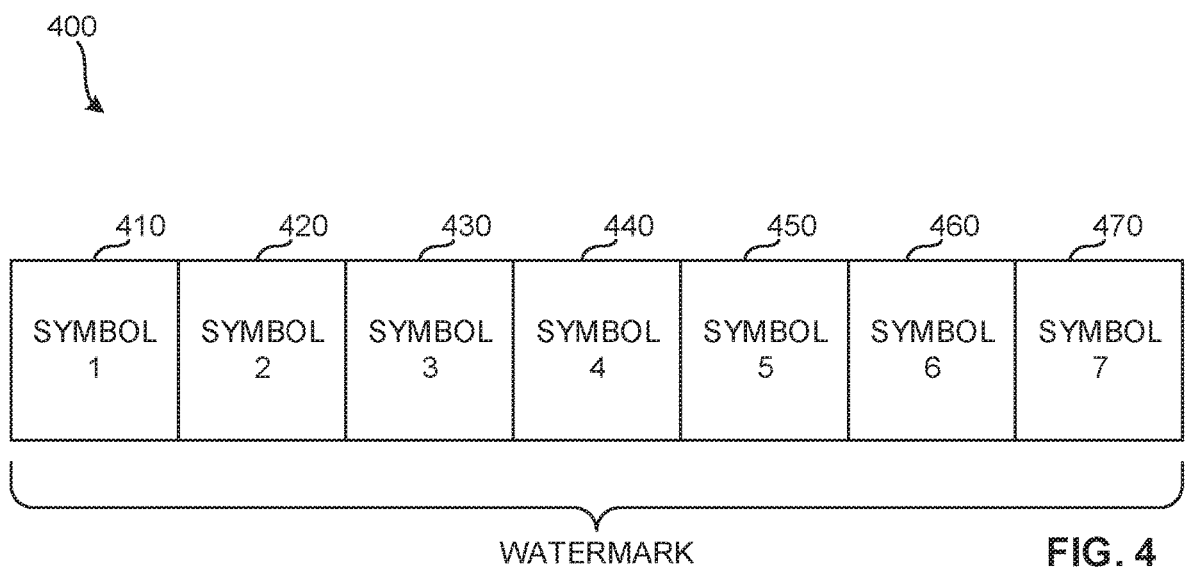
FIG. 4 illustrates an example block diagram of a watermark.

FIG. 4 is a block diagram of an example watermark 400 that may be identified by the example meter 214 of FIG. 2. The example watermark 400 of the illustrated example of FIG. 4 includes seven symbols 410, 420, 430, 440, 450, 460, 470. However, in some examples, the example watermark 400 may include fewer and/or additional symbols. In the illustrated example, each symbol includes seven bits (e.g., with each bit being a binary one or zero). However, each symbol may take on values that represent any other length and/or size, and/or type(s) of information. For example, each symbol may represent one bit of information, 10 bits of information, 100 bits of information, etc. Furthermore, in the illustrated example of FIG. 4, each symbol represents the same number of bits. However, in some examples, different symbols may represent different amounts of information. For example, the first symbol 410 may represent six bits of information, while the second symbol 420 may represent twenty bits of information. In general, smaller symbol sizes may be expected to be more easily distinguished, as there are fewer data points where an error may occur.

Figure 5:
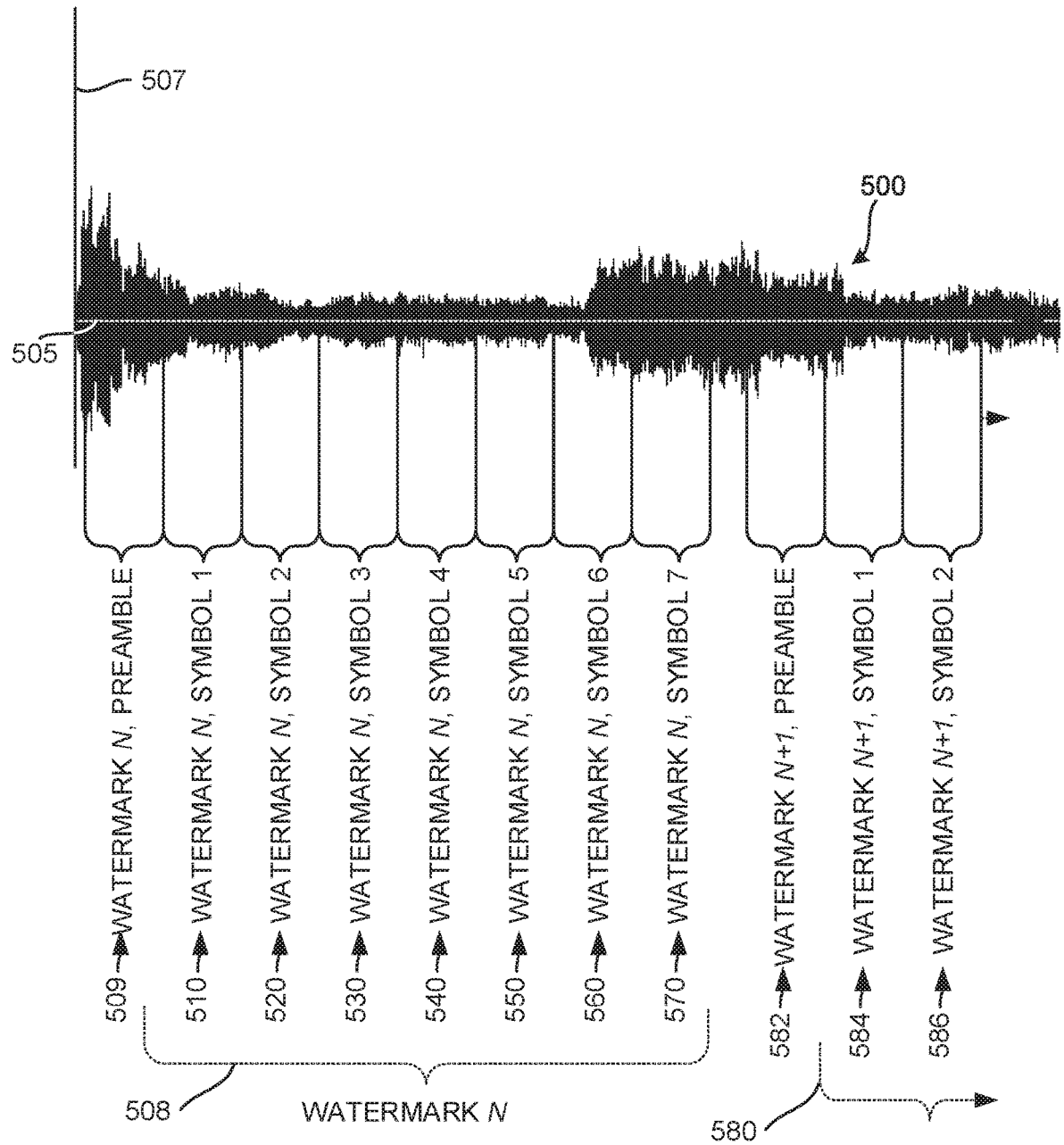
FIG. 5 illustrates an example audio signal including an embedded watermark.

FIG. 5 is an illustration of an example audio waveform 500 and corresponding portions of time within the audio waveform 500 in which portions of the example watermark of FIG. 4 are encoded. The example waveform 500 of the illustrated example of FIG. 5 is presented along a horizontal time axis 505, and a vertical amplitude axis 507. The example audio waveform 500 of the illustrated example of FIG. 5 includes a first example watermark 508 and the beginning portions of a second example watermark 580 transmitted over the time axis 505. In practice, the watermark(s) may be preceded by a preamble to, for example, identify the type of watermark about to be conveyed and/or properties of the watermark. For example, watermark 508 (also referred to as watermark N in FIG. 4) is preceded by a first example preamble 509, and the watermark 580 (also referred to as watermark N+1 in FIG. 5) is preceded by a second example preamble 582. In the illustrated example of FIG. 5, the watermark 508 and its corresponding preamble 509 are represented by approximately 1.6 seconds of the audio waveform 500. In examples disclosed herein, watermarks begin two seconds apart from each other. That is, the beginning of the watermark 580 starts two seconds after the beginning of the watermark 508. As noted in connection with FIG. 4, the example watermarks 508, 580 includes seven symbol segments. In examples disclosed herein, each symbol segment and preamble have a duration of 192 milliseconds.

In the illustrated example of FIG. 5, the preamble 509 of the first watermark 508 is transmitted. Next, the first symbol 510 of the first watermark 508 is transmitted, followed sequentially by the second symbol 520, the third symbol 530, the fourth symbol 540, the fifth symbol 550, the sixth symbol 560, and the seventh symbol 570. After a delay between symbols (approximately one third of a duration of a symbol, approximately 64 milliseconds, etc.), a second preamble 582 corresponding to the second watermark 580 is transmitted. The second preamble 582 is followed by the first symbol of the second watermark 584, the second symbol of the second watermark 586, etc. In some examples, watermarks are repeated when embedded in the presented media.

Figure 6:
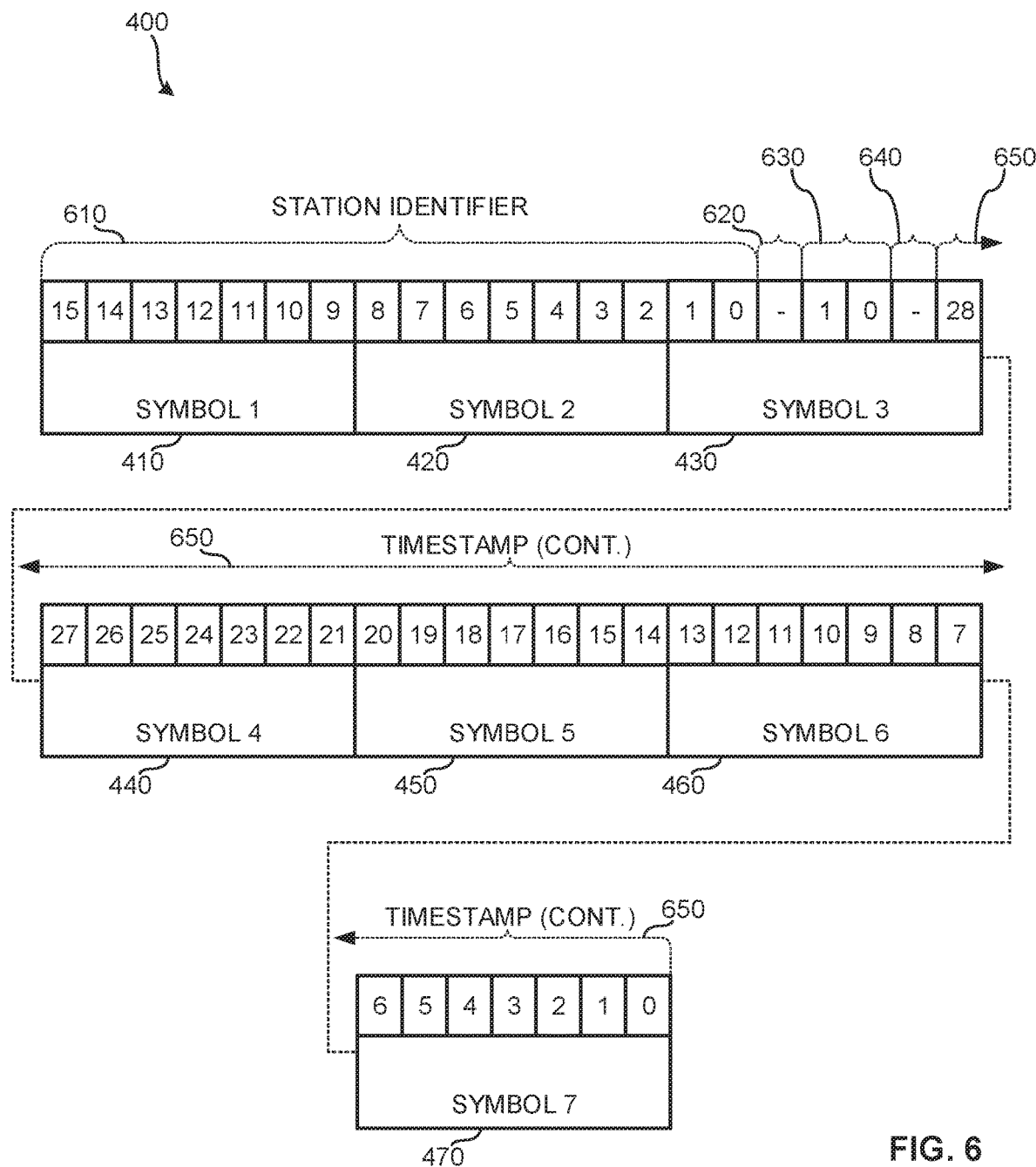
FIG. 6 illustrates an example block diagram of information conveyed in an example embedded watermark.

FIG. 6 is a block diagram illustrating example information components represented by the different symbols of the example watermark 400 of FIG. 4. As noted in connection with FIG. 4, each example watermark includes seven symbols that each encode seven bits of information. In total, the example watermark 400 includes forty-nine bits of information. In the illustrated example of FIG. 6, the forty-nine bits include a sixteen bit station identifier (SID) 610, followed by a reserved bit 620, followed by a two bit distribution channel identifier 630, followed by a one bit daylight savings time flag 640, followed by a twenty eight bit timestamp 650.

The example SID 610 identifies the station over which the media is broadcast. For example, the SID 610 may identify a television station (e.g., channel 7, National Broadcasting Company (NBC), etc.) a radio station, etc. In the illustrated example of FIG. 6, the SID 610 spans over the first symbol 410 (seven bits), the second symbol 420 (seven bits), and the first two bits of the third symbol 430. However, the SID 610 may be positioned in any other location(s) of the watermark 400.

The example reserved bit 620 is positioned as the third bit of the third symbol 430. However, the example reserved bit 620 may be positioned in the other location of the watermark. Moreover, in some examples, the reserved bit 620 may be omitted and/or additional bits of the watermark 400 may be reserved.

The example two bit distribution channel identifier 630 is represented as the fourth and fifth bits of the third example symbol 430 in the illustrated example of FIG. 6. The example two bit distribution channel identifier 630 identifies the type of distribution channel over which the media is being transmitted for presentation. For example, the distribution channel identifier 630 may identify that the media is being broadcast over a live broadcast system (e.g., a cable television network, an IPTV network, etc.) In some examples, the distribution channel identifier may identify that the media is being distributed in a stored format (e.g., in a DVD and/or Blu-ray). In some examples, the distribution channel identifier may identify that the media is being streamed (e.g., transmitted via the Internet).

The example one bit daylight savings time identifier 640 is represented as the sixth bit of the third symbol 430. However, the example one bit daylight savings time identifier 640 may be located in any other position of the watermark. In the illustrated example, the daylight savings time identifier 640 identifies whether daylight savings time is active in the region over which the media is being broadcast. Including the daylight savings time identifier 640 assists in the identification of the media based on the SID 610 and the timestamp 650. For example, while a first program may be presented at a first time identified by the timestamp 650, a second, different, program may be presented at a second time one hour later than the first time. The daylight savings time identifier 640 enables identification of which media was presented.

The example timestamp 650 of the illustrated example of FIG. 6 is represented as the seventh bit of the third symbol 430, the fourth symbol 440, the fifth symbol 450, the sixth symbol 460, and the seventh symbol 470. In the illustrated example, the timestamp is a twenty-nine bit representation of the time at which the media was broadcast. The timestamp 650, in combination with the SID 610, enables the audience measurement entity to identify the media. In the illustrated example of FIG. 6, the higher order bits (e.g., bits representing the year, month, and/or day of the timestamp), are represented in the third symbol 430, fourth symbol 440, and fifth symbol 450. The lower order bits of the timestamp (e.g., bits representing the minutes and/or seconds of the timestamp) are represented in the sixth symbol 460 and the seventh symbol 470. As such the higher order bits (e.g., the third symbol 430, the fourth symbol 440, and/or the fifth symbol 450) are not expected to change frequently (e.g., from one watermark to the next watermark transmitted approximately two seconds later). However, the lower order symbol (e.g., the sixth symbol 460 and the seventh symbol 470) are expected to change at a more frequent pace. For example, the seventh symbol 470, which represents the minutes and seconds portion of the timestamp is expected to change upon every successive watermark. As such, between subsequent watermarks, the seventh symbol 470 is not expected to be the same. As a result, inspection of the seventh symbol 470 to identify repeating values is not likely to provide a repeated result. Instead, the values of the seventh symbol 470 are likely to be changed at a regular cadence. To account for such changes, pattern matching may be applied to identify the likely value of the seventh symbol 470 of the watermark 400.

Figure 7:
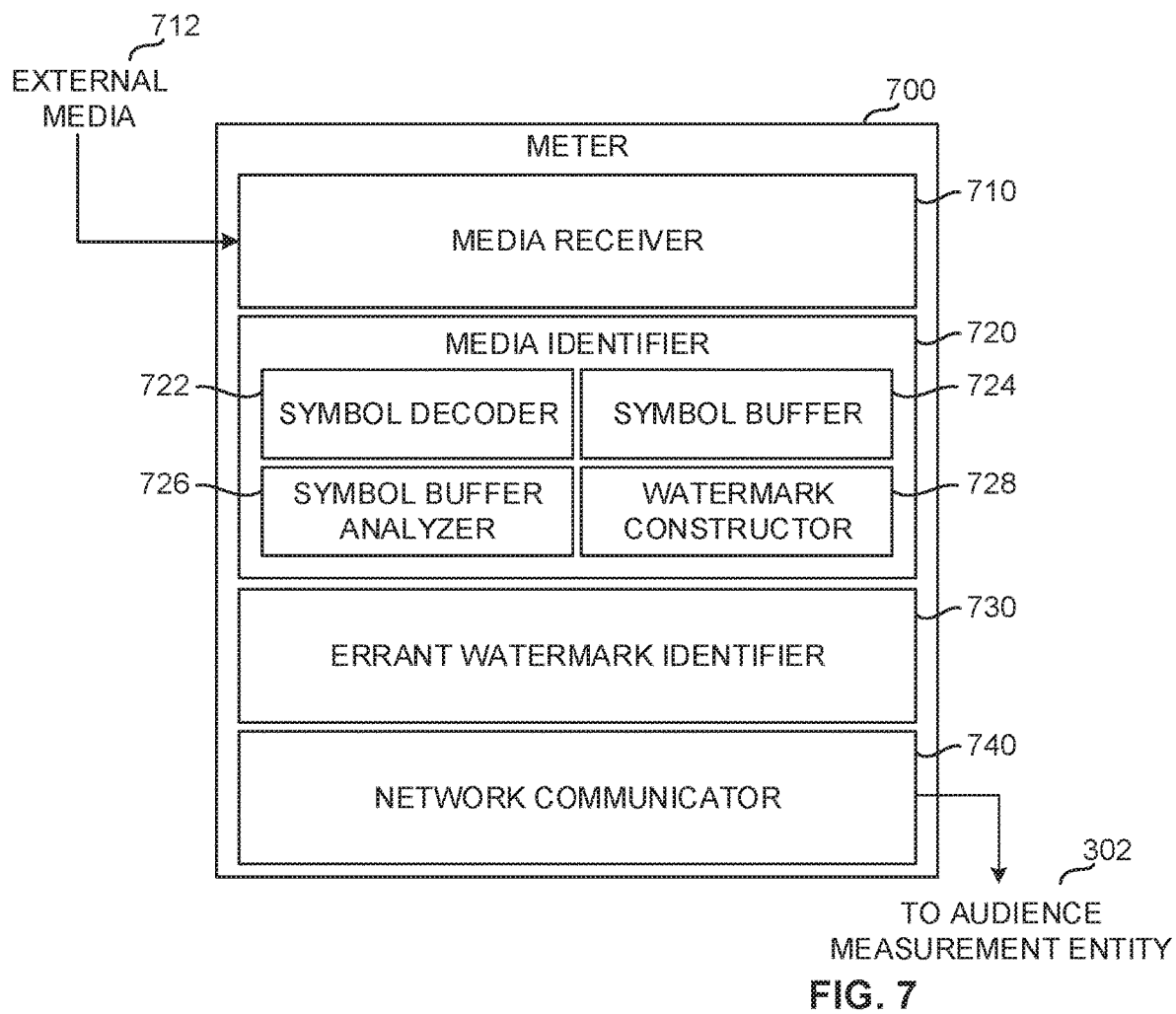
FIG. 7 illustrates an example block diagram of an example meter to detect watermarks.

FIG. 7 illustrates an example block diagram of an example meter 700 to detect watermarks. In some examples, the meter 700 can, for example, be used similarly to the meters 106a, 106b, 106c, 106d, 106e, 106f of FIG. 1 and/or the meter 214 of FIG. 2. The example meter 700 includes an example media receiver 710 to receive example external media 712, an example media identifier 720 having an example symbol decoder 722, an example symbol buffer 724, an example symbol buffer analyzer 726, and an example watermark constructor 728, an errant watermark identifier 730, and an example network communicator 740 to communicate with the example audience measurement entity 302. In some examples, the meter additionally includes a database to store watermark data, the example meter 700 could have more components or fewer components.

In the illustrated example, the media receiver 710 receives external media 712. External media 712 can be received via physical connection or indirectly via emitted audio. In some examples, the media receiver 710 can employ physical connections including a USB connection, a High Definition Media Interface (HDMI) connection, an Ethernet cable connection, etc. The example media receiver 710 can also use indirect watermark detection may including a microphone or other audio sensors.

The example meter 700 also includes the media identifier 720. The example media identifier 720 obtains, from the media receiver 710, the example external media 712 and processes the external media 712. In some examples, the external media 712 is passed through the symbol decoder 722. The example symbol decoder 722 identifies and separates the encoded watermark symbols, decodes the symbols, and places the watermark symbols in the symbol buffer 724. The example media identifier 720 also includes the example symbol buffer analyzer 726 to analyze the symbols stored in the symbol buffer 724. In some examples, the symbol buffer analyzer 726 works with the example watermark constructor 728 to identify and construct full watermarks.

In the illustrated example, the meter 700 includes the errant watermark identifier 730. The errant watermark identifier 730 evaluates the full watermarks decoded by the watermark constructor 728 of the media identifier 720, and the errant watermark identifier 730 determines if the full watermarks are errant watermarks and/or isolated watermarks. For example, if the example meter 700 is disposed in the example media monitoring site 102 of FIG. 1 and assigned to process watermarks for television channel 1 (e.g., would detect the SID 610 corresponding to channel 1), the errant watermark identifier 730 would identify a watermark as errant if the media identifier 720 decoded a watermark for channel 2 or as indecipherable. Additionally, if the media identifier 720 only decodes one errant watermark during a short time interval (e.g., 30 seconds, 2 minutes, etc.), the errant watermark is further identified as an isolated watermark. Additionally or alternatively, if the example meter 700 is disposed in the example media presentation site 202 of FIG. 2, the errant watermark identifier 730 would identify errant watermarks associated with presented media, selected by panelists 104, 106.

In some examples, the meter 700 contains a database for storing a set of watermark data. In some examples, the database can include watermark data having correct watermarks, incomplete watermarks, and/or isolated watermarks. In such examples, the set of watermark data stored in the example database is sent via the example network communicator 740 to the audience measurement entity 302. In some examples, the set of watermark data stored in the database is sent periodically, a-periodically, and/or upon request by the audience measurement entity 302. In the illustrated example, the meter 700 communicates with the example audience measurement entity 302 of FIG. 3 when a number of isolated watermarks, indicating a problem, meets a threshold. Additionally or alternatively, the network communicator 740 can send watermark data as individual watermarks or in batches.

Figure 8:
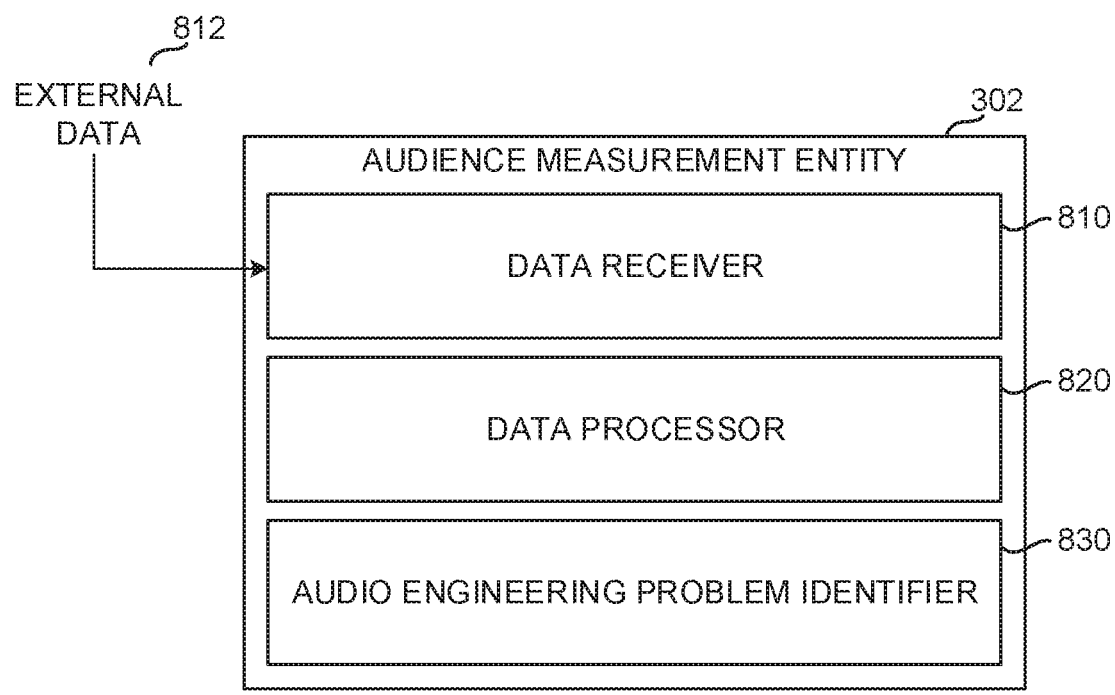
FIG. 8 illustrates an example block diagram of an example audience measurement entity processing example watermark data.

FIG. 8 illustrates an example block diagram of an example audience measurement entity 302 processing example watermark data. In the illustrated example of FIG.

8, the audience measurement entity 302 includes an example data receiver 810, an example data processor 820, an example audio engineering problem identifier 830. In some examples, the audience measurement entity also includes an example errant watermark identifier and/or a database. In other examples, the audience measurement entity 302 may have more components or fewer components.

In the illustrated example, the data receiver 810 receives external data 812 from the example meter 700 (FIG. 7), which, in some examples, is disposed at the media monitoring sites 102, 312, 314, and/or media presentation sites 202, 316, 318, etc. In some examples, the external data 812 includes watermark data including errant watermark data, however, in other examples, the external data 812 includes errant watermark data exceeding a threshold. Additionally or alternatively, the example data receiver 810 stores the received watermark data in the database connected with the audience measurement entity 302. In some examples, the data receiver 810 and the database are separate from the audience measurement entity 302. In the illustrated example, the data receiver 810 and the data processor 820 interact without the database.

The example audience measurement entity 302 also includes the data processor 820. The example data processor 820 receives external data from the data receiver 810, however in some examples, the data processor 820 accesses watermark data stored in the database. In some examples, the data processor 820 performs the general processing of the watermark data. For example, the data processor 820 evaluates the watermark data and associates media presented at example media presentation site 202 with panelists 204 and 206 associated with the meter 214 of FIG. 2. In some examples, the data processor 820 may additionally works as the errant watermark identifier. In such examples, the data processor 820 determines if detected watermarks are errant and/or isolated watermarks by a same or similar process as the errant watermark identifier 730 of FIG. 7.

In some examples, after isolated watermarks have been identified by the data processor 820 and/or the example errant watermark identifier 730 of FIG. 7, the audio engineering problem identifier 850 evaluates the isolated watermarks to determine the existence of an audio engineering problem. For example, if a number of isolated watermarks in a second (e.g., longer) measurement interval of time meets a second threshold (e.g., 15 isolated watermarks in 30 minutes, 10 isolated watermarks in 1 hour, etc.), the example audio engineering problem identifier 850 determines there is a problem with the embedded watermarks. Additionally or alternatively, the example audio engineering problem identifier 850 analyzes isolated watermark data detected by different meters from, for example, different monitoring sites. For example, the example audio engineering problem identifier 850 may analyze a set of watermark data from the media monitoring site 312 and the media monitoring site 314 because both sets of watermark data are associated with the same media 320. For example, the audio engineering problem identifier 850 can determine, based on the set of watermark data detected at media monitoring sites 312 and 314, that both sites have audio engineering problems. In such an example, the audience measurement entity 302 can inform the media broadcaster 310 of an audio engineering problem in the transmission of media 320.

Additionally, the audio engineering problem identifier can determine problems as site-specific (e.g., contained to a single media presentation site). For example, the audio engineering problem identifier 850 detects isolated watermarks at the example media monitoring site 312. However, if the isolated watermarks do not correspond to other media monitoring sites 314 and/or media presentation sites 316, 318, the example audio engineering problem identifier 850 can determine the example media monitoring site 312 has a site-specific problem. In other examples, the audio engineering problem identifier 850 can determine problems as systemic (e.g., related to the embedding of the watermark in the media or related to the transmission of the media). In some examples, the audio engineering problem identifier 850 analyzes a set of watermarks from the media presentation site 316, the media presentation site 318, and the media broadcaster 310, because all three sets of watermark data are associated with the same media 320. In such examples, the audio engineering problem identifier 850 can determine, based on the set of watermark data detected at the media presentation site 316, the media presentation site 318, and the media broadcaster 310 that all three sites have audio engineering problems and can inform the producer of the media of an audio engineering problem prior to transmission of media 320.

Figure 9:
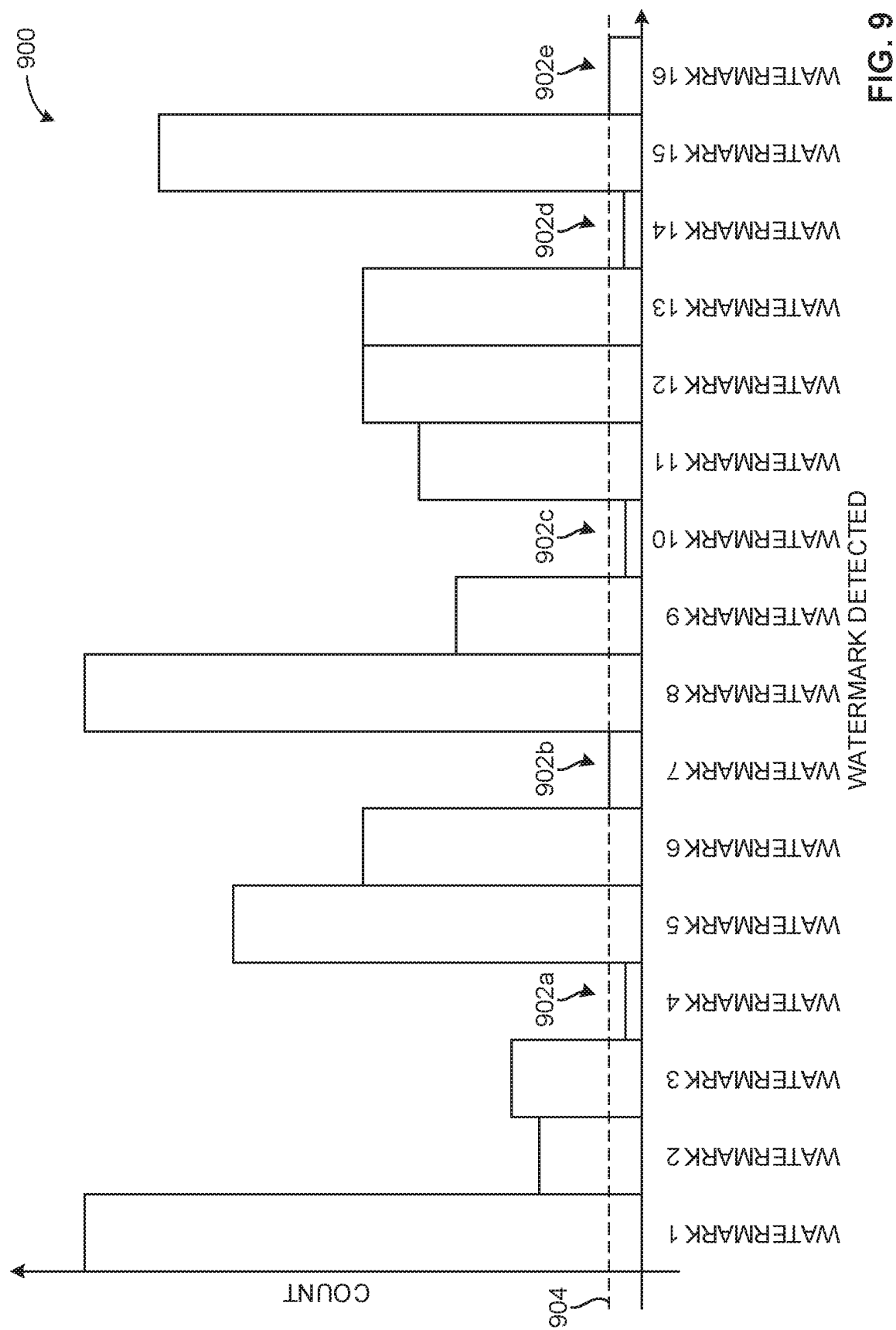
FIG. 9 is a histogram of example detected watermark collection data.

FIG. 9 is a histogram 900 determined by the example data processor 820 (FIG. 8) and/or the errant watermark identifier 730 (FIG. 7) for watermark data collected at the example media presentation site 202 of FIG. 2 and the example media presentation sites 316, 318 of FIG. 3. In the illustrated example, the histogram 900 includes histogram bins for 16 different watermarks included in the data received by the data receiver for a given first measurement interval described above. In some examples, the histogram 900 may include a set of watermark data with more or fewer detected watermarks. In the illustrated example, watermark 4 902a, watermark 7 902b, watermark 10 902c, watermark 14 902d, and watermark 16 902e are isolated watermarks as determined by the example errant watermark identifier 840 of FIG. 8. This is because the isolated watermarks 902a, 902b, 902c, 902d, and 902e have respective number of occurrences at or below an example first threshold 904 for the first measurement interval of time, as described above. In some examples, the threshold 804 can be higher or lower than the values shown in the example of FIG. 9. In some examples, the total number of isolated watermarks detected must meet an additional threshold for the example audio engineering problem identifier 850 (FIG. 8) to determine an audio engineering problem.

While an example manner of implementing the meter of FIGS. 1 and 2 is illustrated in FIG. 7, one or more of the elements, processes and/or devices illustrated in FIG. 7 may be combined, divided, re-arranged, omitted, eliminated, and/or implemented in any other way. Further, the example media receiver 710, the example media identifier 720, the example symbol decoder 722, the example symbol buffer 724, the example symbol buffer analyzer 726, the example watermark constructor 728, the example errant watermark identifier 730, the example network communicator 740, and/or, more generally, the example meter 700 of FIG. 7 may be implemented by hardware, software, firmware, and/or any combination of hardware, software, and/or firmware. Thus, for example, any of the example media receiver 710, the example media identifier 720, the example symbol decoder 722, the example symbol buffer 724, the example symbol buffer analyzer 726, the example watermark constructor 728, the example errant watermark identifier 730, the example network communicator 740, and/or, more generally, the example meter 700 of FIG. 7 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example data receiver 810, the example data processor 830, the example errant watermark identifier 840, the example audio engineering problem identifier, and/or, more generally, the example audience measurement entity 302 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 700 of FIG. 7 may include one or more elements, processes, and/or devices in addition to, or instead of, those illustrated in FIG. 7, and/or may include more than one of any or all of the illustrated elements, processes, and devices.

Figure 10:
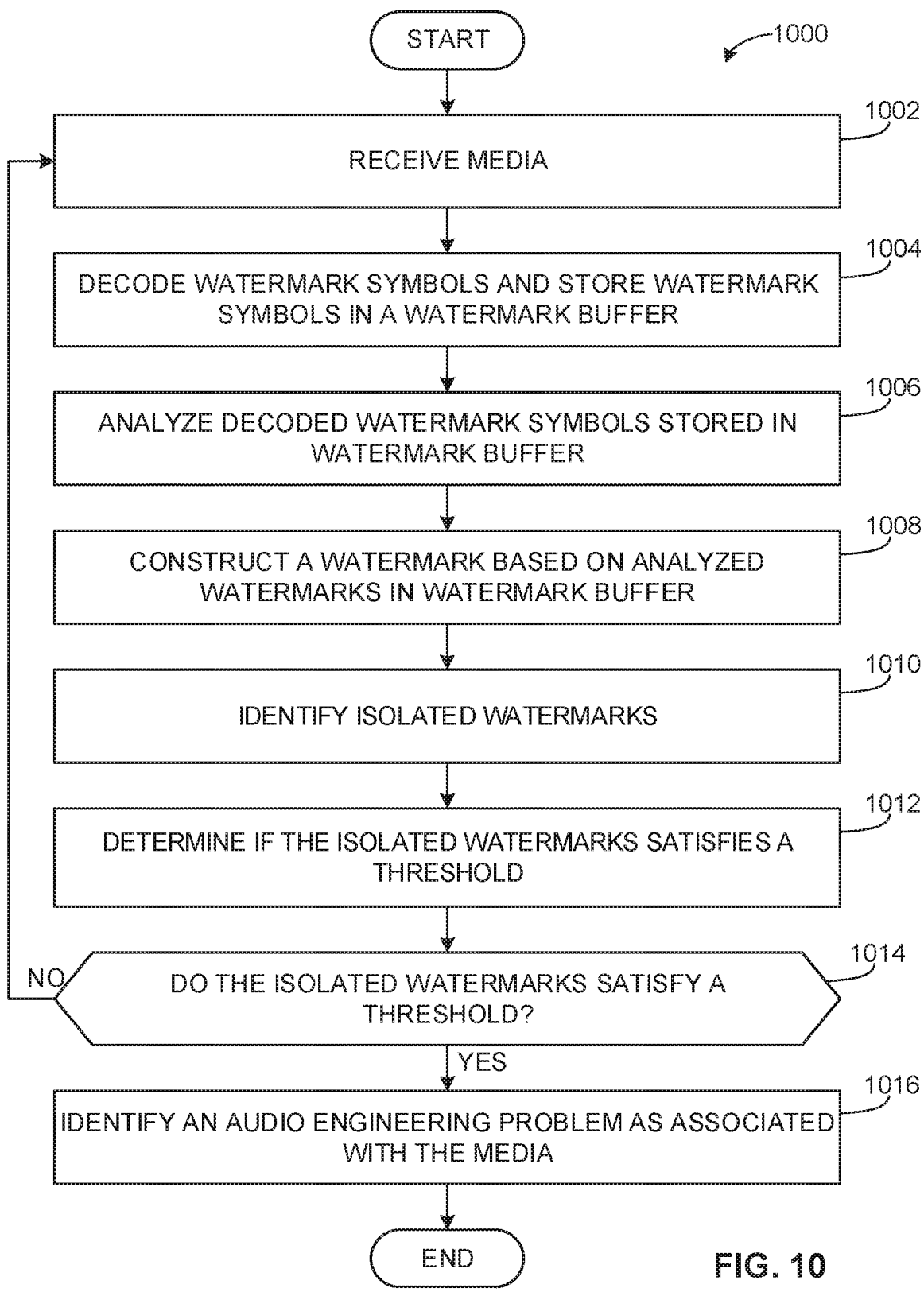
FIG. 10 is a flowchart representative of example computer readable instructions that may be executed to implement the example meter of FIG. 7

A flowchart representative of an example method for implementing the example meter 700 of FIG. 7 is shown in FIG. 10. In this example, the method may be implemented using machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 10, many other methods of implementing the example meter 700 may alternatively be used. For example, the order of execution of the blocks may be changed, and/or some of the blocks described may be changed, eliminated, or combined.

While an example manner of implementing the audience measurement entity of FIG. 3 is illustrated in FIG. 8, one or more of the elements, processes and/or devices illustrated in FIG. 8 may be combined, divided, re-arranged, omitted, eliminated, and/or implemented in any other way. Further, the example data receiver 810, the example data processor 830, the example errant watermark identifier 840, the example audio engineering problem identifier, and/or, more generally, the example audience measurement entity 302 of FIG. 3 may be implemented by hardware, software, firmware, and/or any combination of hardware, software, and/or firmware. Thus, for example, any of the example data receiver 810, the example data processor 830, the example errant watermark identifier 840, the example audio engineering problem identifier, and/or, more generally, the example audience measurement entity 302 of FIG. 3 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example data receiver 810, the example data processor 830, the example errant watermark identifier 840, the example audio engineering problem identifier, and/or, more generally, the example audience measurement entity 302 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience measurement entity 302 of FIG. 3 may include one or more elements, processes, and/or devices in addition to, or instead of, those illustrated in FIG. 3, and/or may include more than one of any or all of the illustrated elements, processes, and devices.

Figure 11:
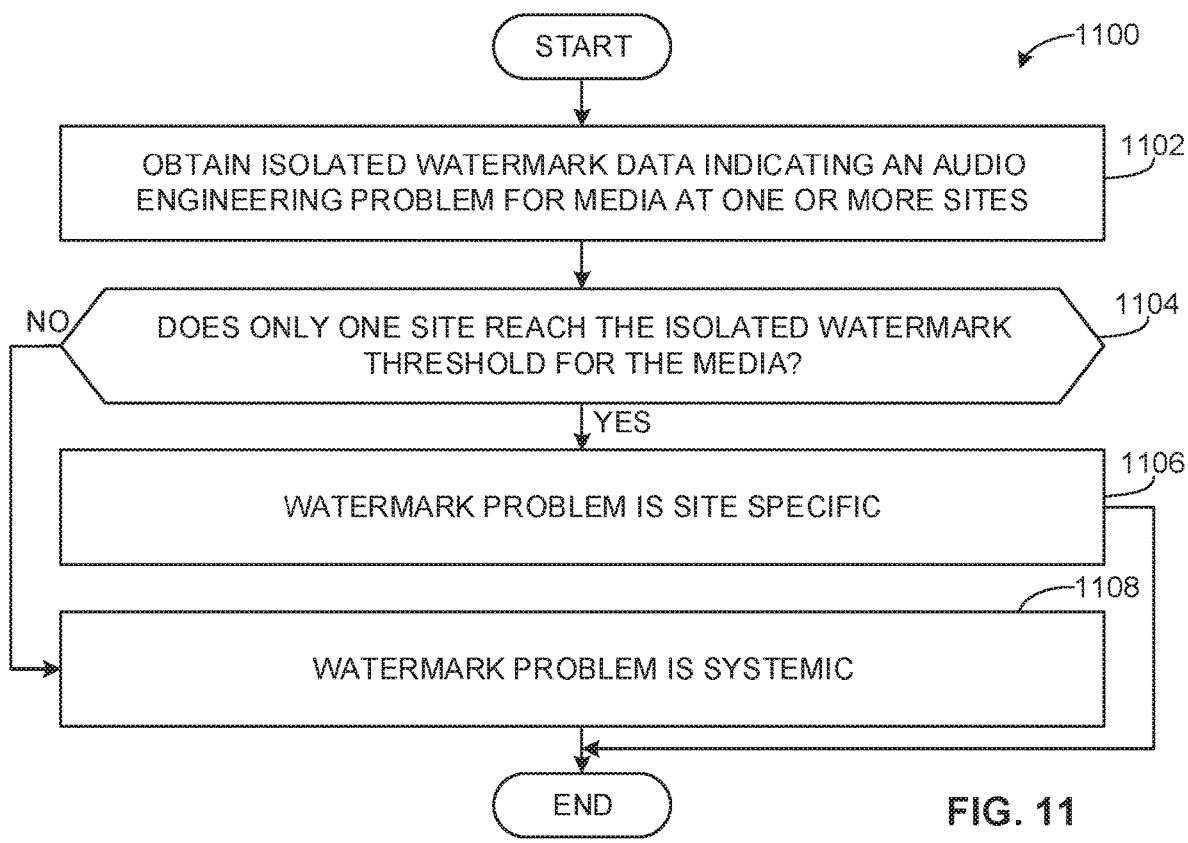
FIG. 11 is a flowchart representative of example computer readable instructions that may be executed to implement the example audience measurement entity of FIG. 8.

A flowchart representative of an example method for implementing the example audience measurement entity 302 of FIG. 3 is shown in FIG. 11. In this example, the method may be implemented using machine readable instructions that comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 11, many other methods of implementing the example audience measurement entity 302 may alternatively be used. For example, the order of execution of the blocks may be changed, and/or some of the blocks described may be changed, eliminated, or combined.

As mentioned above, the example method of FIGS. 10-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 10-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 10 is a flowchart representative of an example computer readable instructions 1000 that may be executed to implement detection and processing of media watermarks by the example meters 106a, 106b, 106c, 106d, 106e, 106f of FIG. 1 and/or the example meter 214 of FIG. 2 and/or the example meter 700 of FIG. 7. The example method 1000 can be performed at least in part by computer readable instructions executed by the example meters 106a, 106b, 106c, 106d, 106e, 106f of FIG. 1 and/or the example meter 214 of FIG. 2 and/or the example meter 700 of FIG. 7. Execution of the example computer readable instructions 1000 is described in connection with the meter 106a and content receiver 104a of FIG. 1, but can, in some examples, be applicable to other monitoring arrangements.

Execution of the example computer readable instructions 1000 starts at block 1002. At block 1002, the example meter 106a of FIG. 1 receives external media 712 from the media device 210 via the example media receiver 710. For example, the external media is received directly, but in other examples, the media is received indirectly.

At block 1004, the example media identifier 720 decodes watermark symbols embedded in the external media 712 via the symbol decoder 722. For example, decoding the first watermark 508 begins with decoding the first symbol 510 of FIG. 5. Additionally, the decoded watermark symbols are stored in a symbol buffer 724 in the example media identifier 720. In some examples, watermark symbols have 7 bits of information, while in other examples, watermark symbols may have more or fewer bits of information.

At block 1006, the symbol buffer analyzer 726 analyzes the example watermark symbols stored in the symbol buffer 724. The example symbol buffer analyzer 726 analyzes the decoded watermark symbols and determines the information transmitted in the watermark (e.g., SID timestamp, etc.).

At block 1008, the watermark constructor 728 concatenates the watermark information to reassemble full watermarks. In accordance with the illustrated example of FIG. 6, the watermark constructor 728 concatenates the bits for the SID 610, reserved bit 620, distribution channel identifier 630, daylight savings time identifier 640, and timestamp 650.

At block 1010, the errant watermark identifier 730 identifies isolated watermarks. In some examples, the isolated watermarks are identified as isolated watermarks when the detected watermarks do not correspond to the example SID 610 (FIG. 6) of the media assigned to the content receiver 104a over a short interval of time (e.g., 30 seconds, two minutes, etc.). In other examples, errant watermarks are compared to, and must satisfy, thresholds.

At block 1012, the example errant watermark identifier 730 determines if the number of isolated watermarks satisfies a threshold for indicating the presence of an audio engineering problem. In some examples, the threshold is based on a number of isolated watermarks detected in a time period (e.g., 5 isolated watermarks detected in 10 minutes, 15 isolated watermarks detected in 5 minutes, etc.) while in other examples, the threshold might be a ratio of isolated watermarks to good watermarks (e.g., 5 isolated watermarks to 300 good watermarks, 15 isolated watermarks to 150 good watermarks, etc.). In some examples, these thresholds can be higher or lower. If the number of isolated watermarks satisfies the threshold, the meter determines there is an audio engineering problem with the media.

FIG. 11 is a flowchart representative of example computer readable instructions 1100 that may be executed to process sets of watermark data and identify site-specific and/or systemic watermark problems with broadcasted media. The example computer readable instructions 1100 can be performed at least in part by computer readable instructions executed by the example audience measurement entity 302 of FIG. 3 and/or FIG. 8. Additionally, execution of the example computer readable instructions 1100 is described in connection with the audience measurement entity 302 of FIG. 3, but can, in some examples, be applicable to other data processing facilities, such as the central facility 290.

Execution of the example computer readable instructions 1100 begins at block 1102. At block 1102, the data receiver 810 of the example audience measurement entity 302 obtains isolated watermark data indicating an audio engineering problem for media for one or more sites. In some cases, the isolated watermark data includes the isolated watermarks and the good watermarks, in other examples, the isolated watermark data includes an indication of the presence of an audio engineering problem and identifying information of the meter and media. The example isolated watermark data may include more or less information.

At block 1104, the audio engineering problem identifier 830 determines if only one site reached the isolated watermark threshold for the media. If meters at one site have determined there is an audio engineering problem associated with the media, and other sites do not detect a problem with the audio engineering, the example audio engineering problem identifier 830 determines the problem is site-specific (Block 1106). Otherwise, if meters at two or more sites detect an audio engineering problem, the audio engineering problem identifier 830 determines the problem is systemic (Block 1108).

Figure 12:
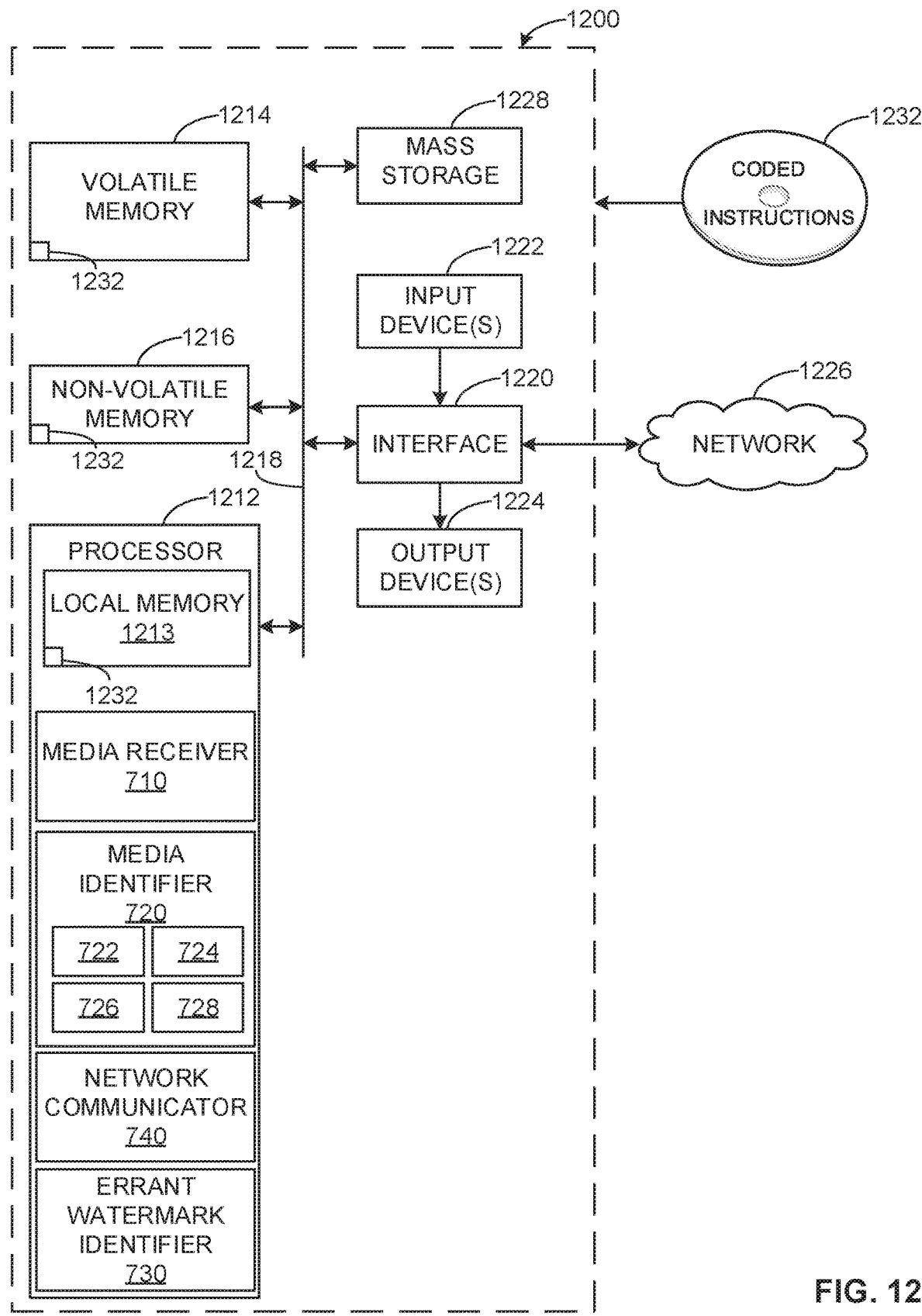
FIG. 12 is a block diagram of an example processor platform structured to execute the example computer readable instructions of FIG. 10 and the example meter of FIG. 7.

FIG. 12 is a block diagram of an example processor platform 1200 structured to execute the example instructions of FIG. 10 to implement the meter of FIG. 7. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example executes the instructions to implement the example audio receiver 710, media identifier 720, symbol decoder 722, symbol buffer 724, symbol buffer analyzer 726, watermark constructor 728, errant watermark identifier 730, and network communicator 740. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip, or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, magnetic media, compact disk drives, Blu-ray disk drives, RAID systems, and digital versatile disk (DVD) drives.

Coded instructions 1232, or computer readable instructions, to implement the methods represented by the flowcharts of FIG. 10 may be stored in the mass storage device 1228, in the volatile memory 1214, in the non-volatile memory 1216, and/or on a removable tangible computer readable storage medium such as a CD or DVD.

Figure 13:
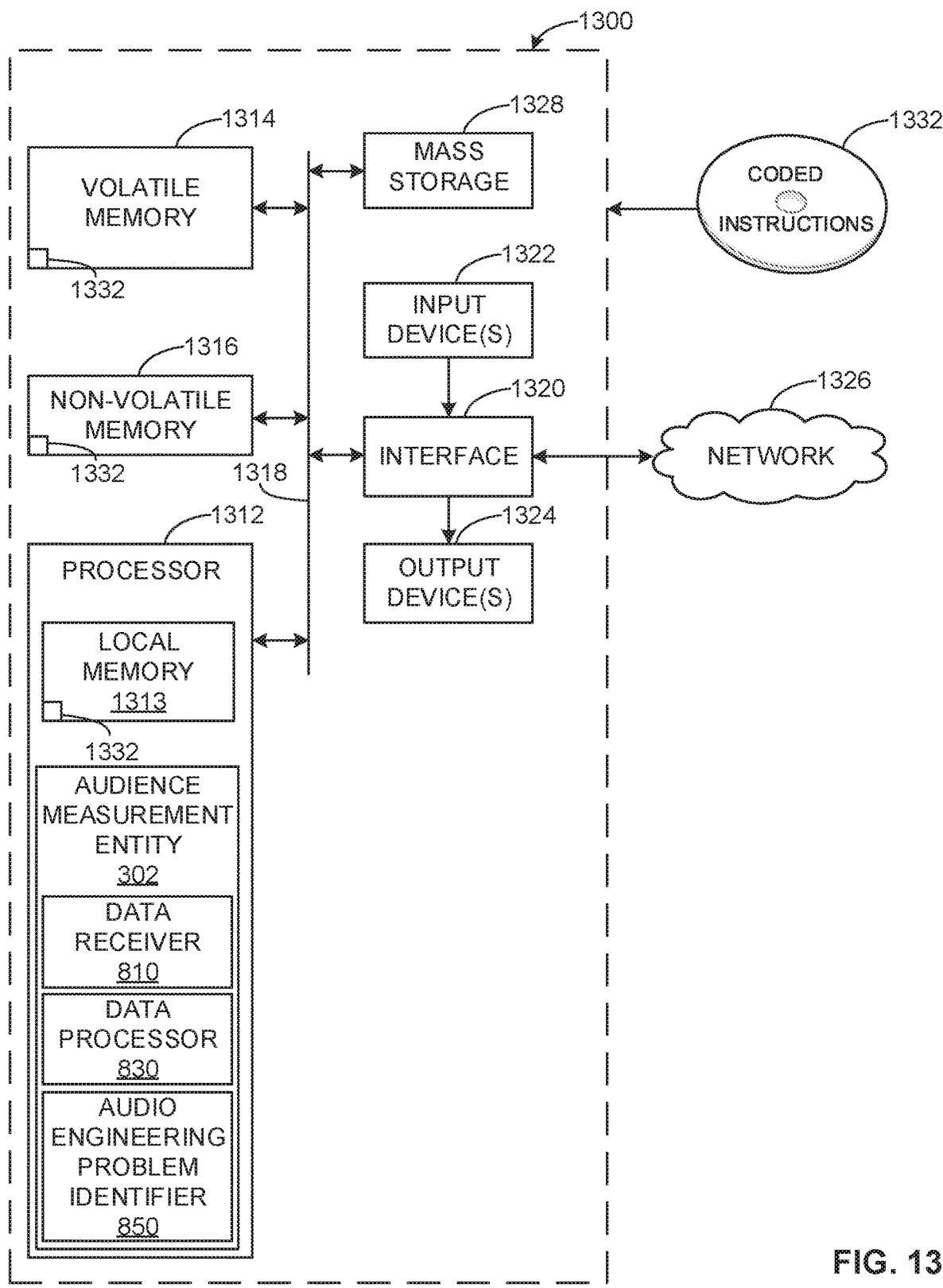
FIG. 13 is a block diagram of an example processor platform structured to execute the example computer readable instructions of FIG. 11 to implement the example audience measurement entity of FIG. 8.

FIG. 13 is a block diagram of an example processor platform 1300 structured to execute the instructions of FIG. 11 to implement the audience measurement entity of FIG. 8. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example data receiver 810, the example data processor 820, and the audio engineering problem identifier 830. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAIVIBUS Dynamic Random Access Memory (RDRAM), and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip, or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, magnetic media, compact disk drives, Blu-ray disk drives, RAID systems, and digital versatile disk (DVD) drives.

Coded instructions 1332, or computer readable instructions, to implement the methods represented by the flowcharts of FIG. 11 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus, and articles of manufacture detect audio engineering problems in media transmitted by media broadcasters and presented at various media presentation sites. Audio engineering problems are detected based on detecting a pattern of isolated or bad watermarks, or a number of isolated/bad watermarks that surpass a threshold. Detection of audio engineering problems can improve the field of media attribution based on watermark detection. Quick responsiveness to audio engineering problems can improve the quality of watermarks embedded in media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect problems with media, the apparatus including:
a receiver to communicate with a first meter to access a first set of watermarks detected by the first meter in first media monitored at a first site, the receiver to communicate with a second meter to access a second set of watermarks detected by the second meter in second media monitored at a second site;
memory including computer readable instructions; and
a processor to execute the computer readable instructions to:
identify isolated watermarks in the first set of detected watermarks obtained from the first media monitored at the first site;
determine, in response to a first number of isolated watermarks identified in the first set of detected watermarks satisfying a first threshold, that a problem has been detected with the first media associated with the first set of detected watermarks;
determine whether the problem is site-specific or systemic, the processor to determine the problem is site-specific if a second number of isolated watermarks identified in the second set of detected watermarks obtained from the second media at the second site does not satisfy the first threshold, and the processor to determine the problem is systemic if the first number of isolated watermarks satisfies the first threshold and the second number of isolated watermarks satisfies the first threshold; and
in response to the problem being systemic, notify a source broadcasting the first media to resolve the problem.

2. The apparatus of claim 1, wherein the processor is to identify a first one of the detected watermarks as an isolated watermark when a count of the first one of the detected watermarks in the first of the detected watermarks satisfies a second threshold.

3. The apparatus of claim 1, wherein the processor is to receive the first media from a media source.

4. The apparatus of claim 1, wherein the processor is to transmit an indication of the problem detected with the first media to an audience measurement entity.

5. The apparatus of claim 1, wherein the first site is a media monitoring site and the second site is a media presentation site.

6. A method to detect problems with media, the method including:
communicating with a first meter to access a first set of watermarks detected by the first meter in first media monitored at a first site;
communicating with a second meter to access a second set of watermarks detected by the second meter in second media monitored at a second site;
identifying, by executing an instruction with a processor, isolated watermarks in the first set of detected watermarks obtained from the first media monitored at the first site;
determining, by executing an instruction with the processor, a problem has been detected with the first media associated with the first set of detected watermarks in response to a first number of isolated watermarks identified in the first set of detected watermarks satisfying a first threshold;
determining, by executing an instruction with the processor, whether the problem is site-specific or systemic, the determining of whether the problem is site-specific or systemic including determining the problem is site-specific if a second number of isolated watermarks identified in the second set of detected watermarks obtained from the second media at the second site does not satisfy the first threshold, and determining the problem is systemic if both the first number of isolated watermarks satisfies the first threshold and the second number of isolated watermarks satisfies the first threshold; and
in response to the problem being systemic, notifying, by executing an instruction with the processor, a source broadcasting the first media to resolve the problem.

7. The method of claim 6, wherein the identifying the isolated watermarks includes identifying a first one of the detected watermarks as an isolated watermark when a count of the first one of the detected watermarks in the first set of the detected watermarks satisfies a second threshold.

8. The method of claim 6, further including receiving the first media from an assigned media source.

9. The method of claim 6, further including transmitting an indication of the problem detected with the first media to an audience measurement entity.

10. The method of claim 6, wherein the first site is a media monitoring site and the second site is a media presentation site.

11. A tangible computer readable storage medium comprising computer readable instructions which, when executed, cause a processor to at least:
communicate with a first meter to access a first set of watermarks detected by the first meter in first media monitored at a first site;
communicate with a second meter to access a second set of watermarks detected by the second meter in second media monitored at a second site;
identify isolated watermarks in the first set of detected watermarks obtained from the first media monitored at the first site;
determine, in response to a first number of isolated watermarks identified in the first set of detected watermarks satisfying a first threshold, that a problem has been detected with the first media associated with the first set of detected watermarks;
determine whether the problem is site-specific or systemic, the processor to determine the problem is site-specific if a second number of isolated watermarks identified in the second set of detected watermarks obtained from the second media at the second site does not satisfy the first threshold, and the processor to determine the problem is systemic if both the first number of isolated watermarks satisfies the first threshold and the second number of isolated watermarks satisfies the first threshold; and
in response to the problem being systemic, notify a source broadcasting the first media to resolve the problem.

12. The computer readable storage medium of claim 11, wherein the instructions, when executed, cause the processor to identify a first one of the detected watermarks as an isolated watermark when a count of the first one of the detected watermarks in the first set of the detected watermarks satisfies a threshold.

13. The computer readable storage medium of claim 11, wherein the instructions, when executed, further cause the processor to transmit an indication of the problem detected with the first media to an audience measurement entity.

14. The computer readable storage medium of claim 11, wherein the first site is a media monitoring site and the second site is a media presentation site.

* * * * *